Patented Sept. 12, 1922.

1,428,646

UNITED STATES PATENT OFFICE.

JAMES H. MacMAHON, OF SALTVILLE, VIRGINIA, ASSIGNOR TO THE MATHIESON ALKALI WORKS, INC., A CORPORATION OF VIRGINIA.

METHOD OF PRODUCING BARIUM CHLORIDE.

No Drawing. Application filed August 20, 1920. Serial No. 404,788.

*To all whom it may concern:*

Be it known that I, JAMES H. MACMAHON, a citizen of the United States, residing at Saltville, in the county of Smyth and State of Virginia, have invented certain new and useful Improvements in Methods of Producing Barium Chloride, of which the following is a full, clear, and exact description.

My invention relates to the successful utilization of crude barium containing materials heretofore considered as of little or no value in the production of the more valuable barium compounds.

One natural source of barium is barytes or barite, composed chiefly of barium sulphate, which has been utilized in various other methods for the production of barium compounds, by first calcining the barytes with coal dust in a suitable furnace and then lixiviating the black ash thus formed to obtain a solution of barium sulphid, which is converted into other compounds by suitable reactions. The black ash which has been lixiviated until all of the water soluble barium, to wit: barium sulphid, has been removed, still ordinarily contains about 10 to 20% of barium, based upon the original weight, which has heretofore been discarded on account of lack of economic methods for its extraction. The barium contained in this exhausted black ash appears to be mainly barium carbonate, although it may contain some polysulphids, and may be advantageously utilized as the barium source in the practice of my invention.

Another natural source of crude barium is the mineral witherite, which is composed chiefly of barium carbonate. Many mineral sources of barium are a mixture of barium carbonate and barium sulphate, which could not heretofore be economically treated as either witherite or barytes, but which are amenable to successful treatment in accordance with my invention.

In accordance with my invention the barium sulphate content may be utilized either before or after the barium carbonate content is utilized. The particular source of material to be used is first finely divided, as for example by grinding, and then digested with an ammonium chloride solution to produce barium chloride which has a ready market.

Since pure barium sulphate on reduction yields a black ash containing some barium carbonate, it is preferable, in order to extract all the barium carbonate in one operation, to pass all mineral sources of barium which may contain barium sulphate in any considerable amount, first through the black ash reduction process. The mineral is therefore mixed with coal dust and calcined which converts the barium sulphate content into a soluble barium sulphid that is removed by leaching or lixiviating, and utilized as a starting material in the production of various marketable barium compounds. The residue or exhausted black ash is well ground or otherwise reduced to a finely divided condition and then heated with a solution of ammonium chloride to digest the same, the reversible action resulting being conveniently illustrated by the following equation:

(1) 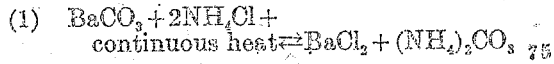
$$BaCO_3 + 2NH_4Cl + \text{continuous heat} \rightleftharpoons BaCl_2 + (NH_4)_2CO_3$$

If the letter $k$ be considered as representing a constant, the equation (1) may also be represented as follows:

(2) 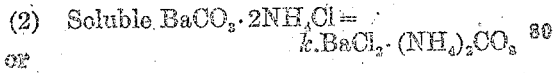
$$\text{Soluble } BaCO_3 \cdot 2NH_4Cl = k \cdot BaCl_2 \cdot (NH_4)_2CO_3$$

or (3) 
$$\text{The constant } k = \frac{\text{soluble } BaCO_3 \cdot 2NH_4Cl}{BaCl_2 \cdot (NH_4)_2CO_3}$$

The value of the constant must remain the same, and the ratio representing its value consequently the same, in order to maintain the reaction. As the reaction proceeds, the ammonium chloride content will decrease and the soluble barium chloride content will increase and the soluble barium carbonate content will decrease, so that in order to maintain the same value of the ratio, the ammonium carbonate must be decreased, which can only be accomplished by removing it from the solution as rapidly as it is formed. One way to remove it is to provide the container in which the reaction takes place with a vacuum connection and aspirate the solution with air, but the simplest way is to continuously boil the solution with or without the aspiration of air through it. The aspiration with air is not essential if the solution actually boils although the use of both may hasten the process. The ammonium carbonate can be volatized and removed and utilized in various ways. If the barium carbonate is not finely divided, it will not pass into solution rapidly enough to maintain the value of the constant and consequently the reaction. This is especially true where the source of barium has a rather small percentage of barium carbonate because the barium carbonate must be rapidly accessible to the ammonium chloride, and the presence of other substances may prevent this if the barium material is not finely divided. It will be seen from the above that the reaction will be much more rapid at the beginning than at a later stage of the operation, but under ordinary conditions the reaction will be 90% completed after an interval of about three hours. The barium chloride passes into solution as formed and may be recovered by filtering, evaporating, and crystallizing in the usual manner.

If desired the natural mineral mixture of barium carbonate and barium sulphate may be finely ground and digested with the ammonium chloride solution in the above manner, which will dissolve out the barium carbonate leaving the barium sulphate unaffected. The residue of barium sulphate can then be calcined with coal dust and lixiviated to obtain the soluble barium sulphid as before. My improved method therefore enables me to utilize barium sources not economically or practically heretofore workable.

It will be obvious that various changes in the details of the herein described method may be made without departing from the principle and scope of the invention as expressed in the appended claims.

I claim:

1. The method of producing barium chloride which comprises reacting upon finely ground barium carbonate with a hot solution of ammonium chloride to form barium chloride and volatile by-products, and removing the volatile by-products substantially as rapidly as formed by aspirating the the solution with air.

2. The method of producing barium chloride which comprises reducing the residue from lixiviated barium black ash to a finely divided condition and then reacting upon the same with a solution of ammonium chloride to produce barium chloride and ammonium carbonate.

3. The method of producing barium chloride which comprises reducing the residue from lixiviated barium black ash to a finely divided condition and then boiling the same with a solution of ammonium chloride to form barium chloride and volatile ammonium compounds.

4. The method of producing barium chloride which comprises reducing the residue from lixiviated barium black ash to a finely divided condition, then reacting upon the same with a solution of ammonium chloride to form barium chloride and volatile by-products, and removing the volatile by-products substantially as rapidly as formed by aspirating the solution with air.

In witness whereof, I hereunto subscribe my signature.

JAMES H. MacMAHON.